United States Patent [19]

Gaetano

[11] 3,729,707
[45] Apr. 24, 1973

[54] INTERMITTENTLY FLASHING WARNING LIGHT

[76] Inventor: Salvatore Gaetano, 95-26 78th Street, Ozone Park, N.Y. 11416

[22] Filed: Dec. 28, 1971

[21] Appl. No.: 212,925

[52] U.S. Cl. ................ 340/81 R, 240/8.18, 340/97, 340/380
[51] Int. Cl. ............................................. B60q 1/52
[58] Field of Search .................. 240/7.1, 8.18, 8.2, 240/8.22; 340/84, 87, 90, 97, 118, 119, 81 R, 380, 321

[56] References Cited

UNITED STATES PATENTS

| 1,753,117 | 4/1930 | Hosking | 340/118 |
|---|---|---|---|
| 2,237,536 | 4/1941 | Wells | 240/8.18 X |
| 2,373,306 | 4/1945 | Gits | 340/321 X |
| 2,466,454 | 4/1949 | Logan | 240/8.18 X |
| 2,591,131 | 4/1952 | Brus | 240/8.18 |
| 2,728,847 | 12/1955 | Stoker et al. | 340/97 X |
| 2,812,423 | 11/1957 | Penna | 240/8.18 |
| 2,959,892 | 11/1960 | Johnson | 340/81 R X |
| 3,114,129 | 12/1963 | Gilbert | 340/87 |
| 3,246,136 | 4/1966 | Cheng | 240/52.1 X |
| 2,718,635 | 9/1955 | Sabiers | 340/90 X |

FOREIGN PATENTS OR APPLICATIONS

| 875,451 | 5/1953 | Germany | 340/54 |
|---|---|---|---|
| 756,224 | 9/1956 | Great Britain | 240/8.18 |

Primary Examiner—John W. Caldwell
Assistant Examiner—Kenneth N. Leimer
Attorney—Samuel J. Stoll et al.

[57] ABSTRACT

An intermittently flashing warning light for motor vehicles having a light-transmitting housing and a window mounting bracket connected to said housing for mounting on the outside of the vehicle, whereby warning light signals are intermittently emitted adjacent and above the roof of the motor vehicle and the vehicle is intermittently illuminated when the device is in operation.

1 Claim, 7 Drawing Figures

Patented April 24, 1973 3,729,707

INVENTOR
SALVATORE GAETANO
BY
ATTORNEYS a pair of light bulbs 12 and 14, mountings

INTERMITTENTLY FLASHING WARNING LIGHT

BACKGROUND OF THE INVENTION

1. Field of the Invention

This invention relates to motor vehicle warning signals, and more particularly intermittently flashing warning lights for motor vehicles.

2. Description of the Prior Art

Intermittently flashing warning lights for motor vehicles are well known to the art. However, they suffer from many deficiencies: For example, when they are portable they cannot readily be mounted from the inside of a motor vehicle. In some instances suction means are provided for mounting such intermittently flashing warning lights on the roof of a motor vehicle, but this kind of mounting cannot readily be achieved from inside the motor vehicle. For one thing, conventional devices of this kind are relatively bulky and are usually stored in the trunk compartment of the motor vehicle. It would require leaving the vehicle and opening the trunk in order to reach such device before it can be put to use. There are times and conditions when it is not feasible for the occupant of a motor vehicle to step outside of the vehicle in order to place a warning light on the roof. Adverse road or weather conditions and poor visibility might militate against the feasibility of a roof mounting, e.g., when traffic is moving at a high rate of speed immediately adjacent a disabled motor vehicle or during a torrential downpour of rain.

One of the deficiencies of suction-mounted warning lights resides in the fact that suction means cannot always be attached to vinyl roofs or to conventional metal roofs under adverse conditions, e.g., when coated with ice or snow. Even under favorable conditions, suction-mounted warning lights cannot readily and securely be attached to the roof of a motor vehicle without stepping outside the vehicle to do so. Moreover, should it be desired to utilize a warning signal while the vehicle is being driven, as when the vehicle is capable of only a slow speed on a high-speed highway, a suction-mounted warning light would not be feasible for the purpose, since it cannot always be securely attached to the vehicle.

In most cases known to applicant, except for built-in warning lights used on emergency vehicles, intermittently flashing lights are battery-powered. Needless to say, batteries are sometimes spent when they are urgently needed. Furthermore, these flashing warning lights are provided with only a single bulb, and when the filament ruptures the entire device is inoperative. Furthermore, conventional intermittently flashing warning lights perform only the single purpose of emitting warning signals, e.g., intermittent flashes of red or amber light. What they fail to do is to provide illumination to illuminate the disabled motor vehicle.

SUMMARY OF THE INVENTION

The present invention provides an intermittently flashing warning light which has a window bracket for mounting the light on the window of a disabled motor vehicle. All that need be done is to partially open the window and clip the present intermittently flashing warning light thereto. This can be done from inside the motor vehicle and does not require that the occupant step out of the vehicle in order to mount the light.

The present invention further provides an intermittently flashing warning light which has a clear light-transmitting housing through which white light is emitted. The same bulb (or bulbs) which provides the intermittent warning signals also provides the white light which is emitted through the housing. Consequently, when the present device is in operation it not only emits intermittent warning signals but also intermittently illuminates the motor vehicle on which it is mounted. The warning signals warn of the presence of a disabled vehicle; the illumination shows the nature and proportions of the disabled vehicle and how it is stationed in relation to the road.

The present invention overcomes or eliminates the deficiencies in the prior art as above enumerated. Thus, the present device can be made relatively small and compact so as to fit into a conventional glove compartment of a motor vehicle. When needed, it is available to the occupant of the motor vehicle without stepping outside either to reach for the device or to mount it. This would be true whether the vehicle is stationary or moving, and regardless of weather or traffic conditions. By plugging it into the cigarette lighter receptacle and clipping it to the side window of the motor vehicle, it is possible to make use of the present device under all normal and adverse conditions. By clipping it to the window and then raising the window to closed position, the present device is locked in place and cannot be dislodged even in a high wind or when the motor vehicle is driven over rough pavement. Also, raising the window as indicated elevates the present device to the point where it emits signals adjacent or above roof level. This makes for enhanced visibility.

The preferred form of this device includes two independently operable bulbs connected in parallel. Each includes its own flashing element. Consequently, should either bulb burn out, the other would remain operable. This is a safety feature which existing flashing warning lights do not possess.

BRIEF DESCRIPTION OF DRAWING

FIG. 6 is a transverse section on the line 6—6 of FIG. 2.

DESCRIPTION OF A PREFERRED EMBODIMENT OF THE INVENTION

Figure 1:
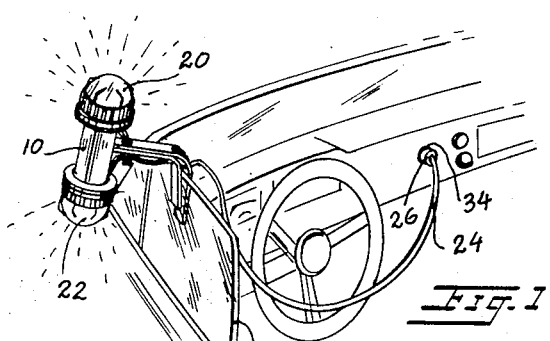
FIG. 1 is a view of an intermittently flashing warning light made in accordance with the present invention and shown mounted on a motor vehicle window.
Figure 3:
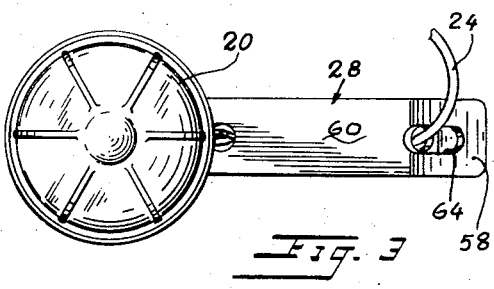
FIG. 3 is a top view.
Figure 2:
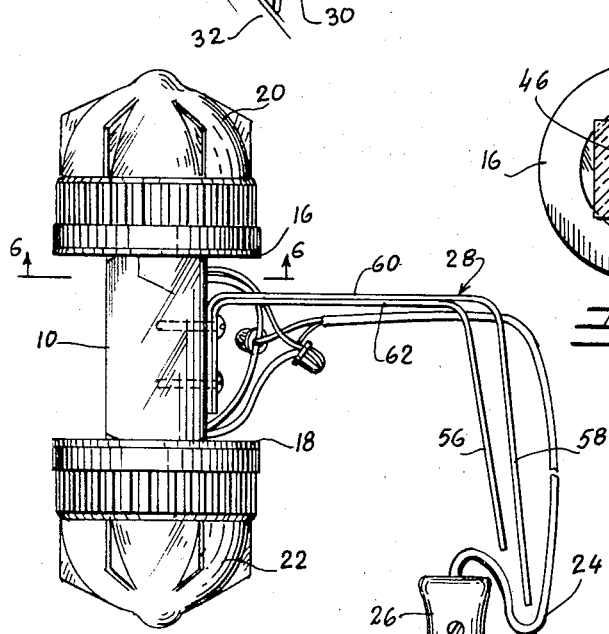
FIG. 2 is an enlarged side view thereof.
Figure 4:
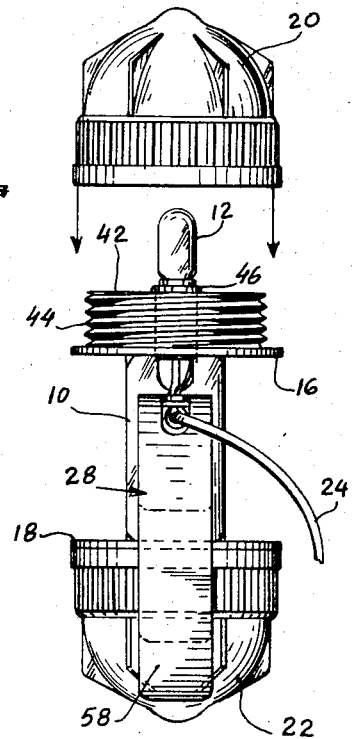
FIG. 4 is a partially exploded view showing one of the light transmitting bulb enclosures removed and spaced from the main body of the device.
Figure 5:
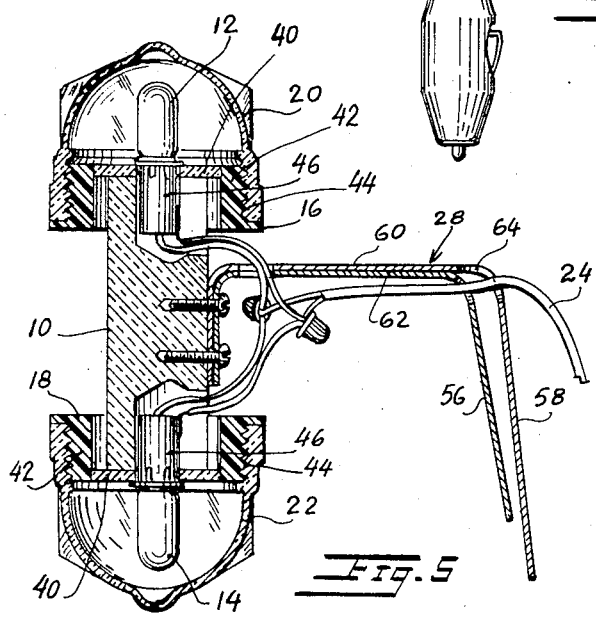
FIG. 5 is a vertical section through said intermittently flashing warning light.
Figure 7:
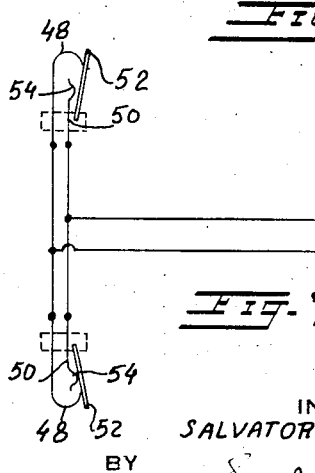
FIG. 7 is a partially schematic circuit diagram showing a preferred form of intermittently flashing warning light bulbs used in connection with the present invention.

Referring now to the details of the invention as illustrated in the drawing, it will be observed that an intermittently flashing warning light which embodies and illustrates the principles of this invention comprises a housing 10, a pair of light bulbs 12 and 14, mountings 16 and 18, respectively, for said light bulbs 12 and 14, enclosures 20 and 22, respectively, for said light bulbs 12 and 14, an electric cord 24 connected to said light bulbs, a plug 26 connected to said electric cord, and a bracket 28 secured to said housing 10 for mounting on a window 30 of a motor vehicle 32. It will be noted in the drawing that plug 26 may be inserted into cigarette lighter receptacle 34 for supplying power from the motor vehicle battery to the two bulbs 12 and 14.

More particularly, housing 10 is made of clear, light-transmitting plastic material such as the acrylic resins which are made and sold by E. I. DuPont De Nemours under the trademark Lucite and by Rohm & Haas Company under the trademark Plexiglas. Mountings 16 and 18 are secured to the opposite ends of housing 10. These mountings (or their base portions alone, as hereinafter mentioned) may also be made of clear, light-transmitting plastics such as the acrylic resins above mentioned, and they may be secured to housing 10 by cement or other conventional means. Mountings 16 and 18 are identical, and each comprises a disc-shaped base 40 and an annular flange 42 connected therewith. External screw threads 44 are formed on annular flange 42. Sockets 46 are provided on bases 40 to receive light bulbs 12, 14. Conventional means are used for securely attaching the light bulbs, e.g., by means of bayonet slots, and conventional means are provided for contacting the terminals of the light bulbs and connecting them to electric cord 24.

Enclosures 20 and 22 are colored plastic shells which function as light filters with respect to light bulbs 12 and 14. Conventionally, these shells may be made of red or amber plastics so that red or amber light may be flashed. Shells 20 and 22 are internally threaded for engagement with screw threads 44 on annular flanges 42. It is by this means that shells 20 and 22 may be secured to mountings 16 and 18, respectively. Conventional light flashing means may be used in the present invention. However, the preferred means, and perhaps the least expensive, is incorporated into light bulbs 12 and 14 as integral parts thereof. As the drawing indicates, each light bulb is provided with a pair of disconnected resistance filaments 48 and 50, respectively. Filament 48 is secured to a thermally responsive element 52 such as a bimetallic element. Filament 50 has a contact loop 54 formed thereon for engagement with a thermally responsive element 52 or filament 48 secured thereto.

When plug 26 is inserted into cigarette lighter receptacle 34, light bulbs 12 and 14 will be energized and light will be transmitted through shells 20 and 22, as well as through mountings 16 and 18 and housing 10. Red or amber light will be emitted through said shells 20 and 22, and white light will be emitted through housing 10. The red or amber light will provide a warning signal, while the white light will illuminate the motor vehicle on which the device is mounted. Thermal elements 52 will be heated and caused to bias away from and out of contact with loops 54 on filaments 50. This will interrupt the circuit to each light bulb and de-energize it. Thermal elements 52 will cool off and re-engage contact loops 54, thereby closing the circuit to each light bulb and re-energizing it. This will result in the intermittent emission of light from both light bulbs through shells 20 and 22 and housing 10. There is no necessary synchronization between the operations of the thermal elements of the two light bulbs.

Bracket 28 as shown in the drawing merely illustrates the various kinds of brackets that may be used in connection with the present invention. What is important is that bracket 28 is bifurcated to provide a pair of oppositely disposed arms 56 and 58. The bracket may be placed on a motor vehicle window by inserting the window between the two arms 56 and 58 and spring tension will hold the bracket in place thereon. Bracket 28 is preferably made of metal with sufficient resilience to provide a spring clip action in engaging the window. An important feature resides in the manner in which cord 24 is supported by bracket 28. The cord extends as shown by way of example in the drawing, below horizontal portions 60 and 62 of bracket 28 and leaves the bracket through hole 64. The cord is thereby protected against pinching between the bracket and the window or window frame of the motor vehicle.

The foregoing is illustrative of a preferred form of this invention, and it will be understood that this form may be modified and other forms provided within the broad scope of the appended claims.

I claim:

1. An intermittently flashing warning light for motor vehicles comprising:
    a. a clear light-transmitting support member;
    b. a pair of light bulbs mounted on opposite ends of said support member;
    c. each of said bulbs including thermally responsive circuit-interrupting means;
    d. colored light-transmitting shells on opposite ends of the support member and enclosing said light bulbs;
    e. an electric cord connected to said light bulbs;
    f. an electric plug connected to said electric cord for plugging into a cigarette lighter receptacle in the motor vehicle; and
    g. a bifurcated bracket connected to said support member for mounting on a motor vehicle window, whereby
    h. energizing said electric light bulbs from the motor vehicle power supply produces intermittent warning signals through the colored light-transmitting shells and intermittent illumination of the motor vehicle through said light-transmitting support member.

* * * * *